United States Patent [19]

Hucke

[11] Patent Number: 4,594,287

[45] Date of Patent: Jun. 10, 1986

[54] DENSIFIED CARBONACEOUS BODIES WITH IMPROVED SURFACE FINISHES

[75] Inventor: Edward E. Hucke, Ann Arbor, Mich.

[73] Assignee: Union Oil Company of California, Los Angeles, Calif.

[21] Appl. No.: 760,271

[22] Filed: Jul. 29, 1985

Related U.S. Application Data

[60] Division of Ser. No. 689,842, Jan. 9, 1985, which is a continuation-in-part of Ser. No. 568,066, Jan. 4, 1984, which is a division of Ser. No. 305,777, Sep. 25, 1981, Pat. No. 4,425,316.

[51] Int. Cl.$^4$ ................................................ C08J 9/02
[52] U.S. Cl. .......................... 428/320.2; 423/447.4; 428/403; 428/407; 428/408; 521/77; 521/82; 521/99; 521/186; 521/189
[58] Field of Search ..................... 521/77, 82, 99, 186, 521/189; 428/320.2, 403, 407, 408

[56] References Cited

U.S. PATENT DOCUMENTS

| | | | |
|---|---|---|---|
| 3,390,107 | 6/1968 | Tashlick et al. | 521/131 |
| 3,779,955 | 12/1973 | Wade | 54/106 |
| 3,919,127 | 11/1975 | Larson et al. | 521/106 |
| 4,132,683 | 1/1979 | Larson et al. | 521/186 |
| 4,548,957 | 10/1985 | Hucke | 521/77 |

*Primary Examiner*—Morton Foelak
*Attorney, Agent, or Firm*—Dean Sandford; Gregory F. Wirzbicki; Robert J. Baran

[57] ABSTRACT

A liquid impregnant containing furfural, an acid catalyst and a pore-forming agent comprising a surfactant, e.g. a polyalkylene oxide adduct, is impregnated into fine grained, isotropic graphite bodies and then polymerized and pyrolyzed. An increase in the density of the impregnated body and an improved surface finish is obtained by means of the liquid impregnant and method of this invention.

6 Claims, No Drawings

DENSIFIED CARBONACEOUS BODIES WITH IMPROVED SURFACE FINISHES

CROSS REFERENCE TO RELATED APPLICATIONS

This application is a division of application Ser. No. 689,842, filed Jan. 9, 1985, which in turn is a continuation in part of U.S. patent application Ser. No. 568,066, filed on Jan. 4, 1984, which is a divisional of U.S. patent application Ser. No. 305,777, filed Sept. 25, 1981, which issued on Jan. 10, 1984 as U.S. Pat. No. 4,425,316.

BACKGROUND OF THE INVENTION

In one aspect this invention relates to novel, improved techniques for densifying and improving the surface finish of fine grained, isotropic graphites.

The invention also relates, in a second aspect, to novel, improved, densified, carbonaceous artifacts which have a superior surface finish and are obtained by impregnating a fine grained, isotropic graphite with a liquid impregnant and subsequently first polymerizing and then pyrolyzing or carbonizing the impregnant.

And, in two other aspects, this invention relates to novel, improved liquid impregnants for use in the techniques of treating fine grained, isotropic graphites identified above and to the novel artifacts impregnated therewith.

Fine grained, molded graphite parts have residual porosity which detracts from performance in some applications in which they are used, such as in crucibles and the like. For example, this porosity generally admits oxidizing media and allows the gaseous products of oxidation to leave the body, thereby generally lowering its oxidation resistance.

Also, in the case of certain crucibles for melting liquid metals, the surface porosity allows some penetration of the liquid into the crucible and thereby contributes to degradation of the crucible.

Also, graphite parts in contact with glass at high temperature are degraded by glass entering the surface pores of the crucible. This causes sticking and subsequent breaking away of the crucible surface when the contact is broken. The pores also contribute to a general loss of strength.

In order to overcome these difficulties a wide variety of impregnation process have been practiced in the graphite industry.

For example, decomposition of a gas phase to close interconnected pores and prevent unwanted penetration of graphitic material is suggested in U.S. Pat. No. 3,084,394 to Bickerdike.

Impregnation of carbon and other porous bodies with furfural alcohol to fill their pores is described by I. S. Goldstein and W. A. Dreker in Industrial Engineering Chemistry, 52, 57 (1960).

In U.S. Pat. No. 3,628,984, Ishikawa and Teranishi disclose the use of a solution of furfural and acetone with two catalytic additives to impregnate graphite bodies in order to reduce porosity and improve properties obtained after the body is cured in an acid bath and subsequently carbonized. Unfortunately, both catalysts and the acetone are required to achieve the desired results.

A group of liquids that can be cast into pyrolyzable, free-standing bodies, with highly controlled systems of porosity, is disclosed in U.S. Pat. No. 3,859,421. It has recently and unexpectedly been discovered that certain of these liquids can also be used to impregnate fine-grained, isotropic graphites. The subsequent polymerization and pyrolyzation of those liquid impregnants reduces the susceptibility of the impregnated graphitic body to degrative attack by increasing its density and decreasing the average size of the number of interconnected pores opening onto the surface of the body.

That fine grained, isotropic graphites can be successfully treated by the technique just described is important because technical demands for higher strength and quality, etc. and the elimination of anisotropic characteristics have led to the increasing use of such isotropic graphites.

Fine grained graphites, such as those manufactured and sold by Poco Graphite Company, have grain sizes of about 0.001 inch and residual, interconnected pores typically about 0.4 micron in size. These fine-grained, small pore graphites yield a superior surface finish when they are machined.

However, it has been found that even these fine-pored graphites can be impregnated, and surface finish and product performance further improved, using the novel impregnating techniques and impregnants disclosed herein.

SUMMARY OF THE INVENTION

The present process for improving the properties of fine-grained, isotropic graphites involves the following steps:

(1) Preparing a liquid impregnant by mixing furfural or furfural alcohol or a mixture of those compounds and various pore forming agents comprising a surfactant selected from the group consisting of anionic, cationic, nonionic and amphoteric surfactants, e.g. a polyalkylene oxide adduct at room temperature with an acid polymerization agent;

(2) Submersing the graphitic body to be impregnated in the liquid impregnant;

(3) Polymerizing the liquid impregnant into a cured resin in the pores of the graphitic body by holding it at a desired temperature for an appropriate time; and (4) Heating the graphite body, with the cured resin within it, to a pyrolyzation temperature to convert the carbon in the cured resin to inorganic carbon.

Furthermore this invention provides a densified carbonaceous artifact with a superior surface finish, said artifact comprising: a permeable body composed essentially of a fine grained, isotropic graphite, the pores of said body being filled with the pyrolyzation product of a resin obtained by polymerizing an impregnant containing furfural, or furfural alcohol or a mixture thereof, an acid catalyst, and a liquid pore-forming agent comprising a surfactant selected from the group consisting of anionic, cationic, nonionic and amphoteric surfactants a polyalkylene oxide adduct.

In addition, this invention provides a liquid impregnant for densifying a permeable body composed essentially of a fine grained, isotropic graphite, said impregnant comprising: furfural or furfural alcohol or a mixture thereof, an acid catalyst, and one or more pore-forming agents comprising a surfactant selected from the group consisting of anionic, cationic, nonionic and amphoteric surfactants e.g. a polyalkylene oxide adduct.

Finally, this invention provides a structure which is capable of being converted into a densified carbonaceous artifact, said structure being composed of a body which is essentially a fine grained, isotropic carbon with the pores thereof filled with a liquid impregnant containing furfural and/or furfural alcohol, an acid polymerization catalyst, and one or more pore-forming agents comprising a surfactant selected from the group consisting of anionic, cationic, nonionic and amphoteric surfactants a polyalkylene oxide adduct or the polymerization products of an impregnant as aforesaid.

DETAILED DESCRIPTION OF THE INVENTION

In the present invention, the impregnating liquids used are suited to give exceptional and unexpected results. Specifically, the prior art uses furfural alcohol, furfural alcohol resins, or furfural as impregnants with the aim of producing a carbon within the pores of a carbon body in order to eliminate the pores within it. The materials typically produce a carbon within the pores that is cracked due to the large shrinkage it undergoes upon carbonization or pyrolyzation. Exemplary of the processes that would be expected to produce carbons with this susceptibility are those disclosed in the Bickerdike patent and the Goldstein article identified above.

Ishikawa et al. (see U.S. Pat. No. 3,628,904) were able to overcome this difficulty to some extent by using an impregnant composed of furfural mixed with acetone and two catalysts.

However, upon pyrolyzation, the liquid impregnants of the present invention form a carbon in the pores of the impregnated body that has within it a much finer pore structure than any Ishikawa was able to produce. This carbon has excellent strength and hardness.

The pores in the impregnant-based carbon, produced by the process of the present invention, are in the range of 100-1500 angstroms (0.01 to 0.15 micron) and are interconnected, thereby allowing an escape route for the gases given off during carbonization. (Throughout this disclosure the dimension of the pores, referred to, is the diameter.) This structure is important as the cracking upon pyrolysis to which prior art impregnants were susceptible is thereby avoided.

The liquid impregnants are also very low in viscosity and completely wet the graphite allowing even the finest of the pores in the original graphite body to be filled with the impregnant. They furthermore undergo much less linear shrinkage (18 to 22%) during carbonization than does pure furfural alcohol or furfural (35-45%). In addition no volatile components such as acetone are present in said liquid impregnants. The presence of volatile compounds in the liquid impregnant is undesirable as such constituents tend to leave the body by evaporation, thereby drawing out the resin to the surface. This is undesirable both because it leaves an unwanted "skin" on the surface of the carbonaceous body and because pores in that body are left unfilled, thereby detracting from the very properties the impregnant is employed to provide.

One excellent liquid impregnant for the fine grained, isotropic graphite manufactured by Poco Graphite Company can be made by dissolving para toluene sulfonic acid (catalyst) in an ethylene oxide adduct of octylphenol, e.g. an ethyleneoxide adduct having about 40 moles of ethylene oxide and then adding furfural until the latter comprises from about 60 to about 80 volume % of the solution. The concentration of para toluene sulfonic acid in this impregnant varies from about 5 to about 20 weight % of the furfural.

Furfural alcohol may be substituted for furfural in whole or in part in the foregoing mixture, and other polyalkylene adducts comprising a hydrophobic residue, e.g. polyethylene or polyethylene-polypropylene adducts of alkylphenols, naphthol or alkylnaphthols may be substituted in whole or in part for the above-exemplified adduct. Other acid catalysts known in the art such as phosphoric and hydrocholoric acids may be used in place of the para toluene sulfonic acid. The exact ratios of ingredients is not critical, and the concentration of each component usually falls within the ranges specified below:

| Acid Catalyst | 2-20 weight % furfural/ furfural alcohol |
|---|---|
| Furfural/ Furfural Alcohol | 40-85 Volume % |
| Pore-forming Agent | Balance |

The times and temperatures employed to first polymerize and then pyrolyze the liquid impregnant can vary widely, depending upon the composition of the liquid impregnant. In general, the guidelines set forth in U.S. Pat. No. 3,859,421 for the consolidation and pyrolyzation steps described therein can be followed; and the patent is, accordingly, incorporated herein by reference. In fact, even higher concentrations of catalyst are practically usable, allowing faster rates since the impregnant is highly distended in a good conducting graphite body.

The pore-forming agent comprises a surfactant selected from the group consisting of anionic, cationic, nonionic and amphoteric surfactants. Examples of such surfactants include Soaps, Primary alkylammonium salts, Esters of polyhydric alcohols, Betaines, Sulfated esters, Secondary alkylammonium salts, Alkoxylated amides, Amino Acids, Sulfated amides, Tertiary alkylammonium salts, Esters of polyoxyalkylene glycols, Sulfated alcohols, Quaternary alkylammonium salts, Ethers of polyoxyalkylene glycols, Sulfated ethers, Acylated polyamines, Alkylolamine-fatty Sulfated carboxylic acids, Salts of heterocyclic amines, Acid condensates, Petroleum sulfonates, Benzylammonium salts, Tertiary acetylenic glycols, Sulfonated aromatic hydrocarbons, Dialkyl polyoxyalkylene phosphates Sulfonated aliphatic hydrocarbons, Sulfonated esters, Sulfonated amides, Sulfonated ethers, Acylated amino acids, Acylated polypeptides, Metal alkyl phosphates.

While not wishing to be bound by theory, it is believed that the function of the surfactant, in addition to its action as a pore-forming agent, is to uniformly disperse the solids generated during the polymerization of the furfural or furfural alcohol monomers into the solid resin. That is, as the solid phase begins to form, it is uniformly dispersed by the surfactant. By this action the pores resulting upon carbonization of the solid resin are of a substantially uniform dimension and interconnecting.

Thus the surfactant functions as a dispersant for the solids forming from the polymerized liquid impregnant. In view of this theory, it will be understood that increasing the concentration of the surfactant in the liquid impregnant will more finely disperse the solid resin thereby resulting, upon pyrolysis, in a composite having a smaller average pore size.

The surfactant must also volatilize during the subsequent pyrolysis of the furfural and/or furfural alcohol resin to form the microporous structure. Thus, although the generally less volatile anionic, cationic and amphoteric surfactants are suitable pore-forming agents, the nonionic surfactants are preferred for their generally more desirable volatility characteristics.

The pore-forming agent of the instant invention may be selected from the group consisting of compounds represented by the following general formula I:

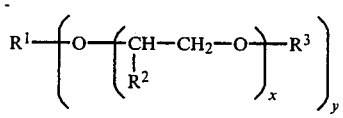

wherein $R^1$ is a hydrophobic radical selected from the group consisting of hydrocarbyl and heteroatom substituted hydrocarbyl radicals; $R^2$ and $R^3$ are independently selected from the group consisting of hydrogen, hydrocarbyl and heteroatom substituted hydrocarbyl radicals; x is an integer ranging from 1 to about 100 and y is an integer ranging from 1 to about 4. The heteroatoms that may be substituted in the above hydrocarbyl radicals include halogen, oxygen, nitrogen, sulfur and phosphorus atoms. Preferably $R^1$ is derived from compounds selected from the group consisting of alkylphenols, naphthols, alkylnaphthols, carboxylic acids, amines, amides, phosphates and sulfates having at least 3 carbon atoms, more preferably at least 10 carbon atoms, most preferably from about 14 to about 30 carbon atoms, e.g. about 15 carbon atoms, by reacting said compounds with an epoxide, e.g. ethylene oxide, propylene oxide, etc. $R^2$ is derived from the epoxide and is preferably selected from the group consisting of hydrogen and alkyl radicals having from 1 to 4 carbon atoms, more preferably $R^2$ is selected from the group consisting of hydrogen and methyl radicals, and most preferably $R^2$ is hydrogen. $R^2$ may be a mixture of radicals, for example hydrogen and methyl when a mixture of ethylene oxide and propylene oxide is reacted with the compound providing the hydrophobic radical. The mixture of ethylene oxide and propylene oxide may be reacted with the hydrophobic residue to provide block polymers or random polymers. $R^3$ is preferably selected from the group consisting of hydrogen and alkyl radicals having from 1 to 4 carbon atoms; most preferably $R^3$ is hydrogen. x preferably varies from about 10 to about 60, more preferably from about 30 to about 50, e.g. about 40. y is preferably 1 or 2; more preferably y is 1.

Examples of suitable pore-forming agents include the commercially available glycol ethers of alkyl phenols of the following general formula II:

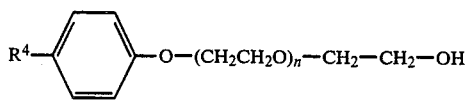

wherein $R^4$ is a substituted or unsubstituted alkyl radical having from 1 to 18 carbon atoms, preferably 8 or 9 carbon atoms; a substituted or unsubstituted aryl radical or an amino group and n is an integer of from about 10 to about 100 preferably from about 30 to about 50, e.g. about 40.

These nonionic surfactants are available in a wide array of molecular weights depending primarily on the value of "n", i.e. the number of ethylene oxide repeating units.

Procedures for the preparation of the glycol ethers of formula II are well known and are described, for example, in U.S. Pat. Nos 2,213,477 and 2,496,582, which disclosures are incorporated herein by reference. Generally, the production of these compositions involves the addition of substituted phenols with varying molar proportions of ethylene oxide monomer.

Preferably, said polyalkyleneoxide nonionic surfactants suitable for use in the invention include the glycol ethers of alkylated phenols of the above general formula II: wherein $R^4$ is an alkyl radical of from 1 to 18 carbon atoms, preferably 8 or 9 carbon atoms; and n is an integer from about 10 to about 100, preferably from about 30 to about 50, e.g. about 40.

The most preferred glycol ethers of the type generally described in formula II are the octyl-or nonylphenoxy (polyethyleneoxy) ethanol compositions of the formula wherein n ranges from about 30 to about 50. Commercially available surfactants of this type are supplied by the GAF Corporation under the designation IGEPAL. Other commercially available surfactants of this type are supplied by the Thompson-Hayward Chemical Co. and Whitestone Chemical Co. These materials are also available from Rohm and Haas Corporation as TRITON surfactants, e.g. as Triton X-100.

Other suitable pore-forming agents are the poly(oxyethylene)-poly(oxypropylene)-poly(oxyethylene) or, as otherwise described, propoxylated, ethoxylated propylene glycol nonionic surfactant block polymers of the general formula III:

wherein a, b and c are positive integers and wherein a and c total from about 10 to about 100, e.g. from about 30 to about 50 and b ranges from about 5 to about 50. These surfactants comprise the block polymers of ethylene oxide and propylene oxide, with the repeating units of propylene oxide constituting the hydrophobic portion of the surfactant and the repeating units of ethylene oxide constituting the hydrophilic portion of the surfactant. These compositions can be prepared, and are commercially available, in a variety of molecular weights, depending primarily on the number of repeating units of propylene and ethylene oxide.

Suitable procedures for the production of the block polymers of Formula III are described in the patent literature in, for example, U.S. Pat. Nos. 2,674,619; 2,677,700 and 3,101,374, all three of which are incorporated herein by reference. Generally, these block polymers are prepared by a controlled addition of propylene oxide to the two hydroxyl groups of propylene glycol to form the hydrophobe, followed by the controlled addition of ethylene oxide to "sandwich" in the hydrophobe between the two hydrophilic polyethyleneoxide groups. The nonionic surfactants of this type (Formula III) are available from the BASF-Wyandotte Corporation under the PLURONIC designation.

Still other polyalkyleneoxide nonionic surfactants suitable for use in the invention are the block polymers of ethylene and propylene oxide derived from nitrogen-containing compositions such as ethylene diamine of the general formula IV:

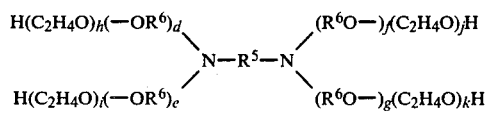

where $R^5$ is an alkylene radical having from 2 to 5 carbon atoms, preferably 2; $R^6$ is alkylene radical having 3 to 5 carbon atoms, preferably 3; d, e, f, g, h, i, j and k are positive integers; and h, i, j, and k total from about 10 to about 100 e.g. from about 30 to about 50. d, e, f and g may total from about 4 to about 100, e.g. from about 30 to about 60.

The polyalkylene oxide nonionic surfactants of formula IV are prepared by the addition of a $C_3$ to $C_5$ alkylene oxide to an alkylene diamine under conditions to add two polyoxylakylene groups to each of the nitrogen groups in the presence of a catalyst so as to polymerize the oxyalkylene groups into the desired polyoxyalkylene radicals. After the desired addition and polymerization of the $C_3$ to $C_5$ alkylene oxide group has been completed, ethylene oxide is introduced and is added to the polyoxyalkylene groups to impart the desired hydrophilic characteristics to the compound. The preparation of these materials from commercially available alkylene diamines and alkylene oxides is known in the art. In general, these surfactants are prepared by mixing the $C_3$ to $C_5$ alkylene oxide with the alkylene diamine at atmospheric or elevated pressures, at temperatures between about 50° to 150° centigrade in the presence of an alkaline catalyst such as an alkali metal hydroxide or alcoholate. The degree of polymerization or the size of the hydrophobic group is controlled by the relative proportions of $C_3$ to $C_5$ alkylene oxide and alkylene diamine, the alkylene oxide being introduced in sufficient quantity to obtain a hydrophobic base weight of about 200 to about 4000 e.g. from 2000 to about 3600, although other weights can be provided. The surfactants of (formula IV) are available from the BASF Wyandotte Chemicals Corporation under the TETRONIC designation.

From the foregoing it will be apparent to the reader that one important and primary object of the present invention resides in the provision of novel, improved, densified components and artifacts composed of fine grained, isotropic graphites which have a superior surface finish and are impregnated with inorganic carbon of yet finer, extremely small grained nature which is hard and strong and has interconnected pores and is highly resistant to cracking.

Another important, primary object of the invention resides in the provision of methods for making components and artifacts of the character identified in the preceding object.

Still another important, and primary, object of the invention is to provide novel liquid impregnants for use in the process identified above which are capable of wetting isotropic graphites, and consequentially, capable of filling even the finest pores of the structures into which they are impregnated.

And yet another important, and primary, object of the invention is to provide novel impregnated structures which can be converted, by the application of heat, into components and artifacts of the character identified in the first of the foregoing objects with only minimal shrinkage of the materials with which the graphite structures are impregnated.

Another more specific, but nevertheless important, object of the invention resides in the provision of the methods in accord with the preceding objects in which the artifact or component is made by impregnating the fine grained, isotropic graphite with a liquid impregnant containing furfural or furfural alcohol or a mixture thereof, an acid catalyst, and one or more of the above-described pore-forming agents; heating the impregnated structure until polymerization occurs; and then pyrolyzing the organic constituents of the impregnant to produce a still finer grained carbon in the pores of the isotropic graphite.

A related, still more specific, object of the present invention resides in the provision of methods in accord with the the preceding object in which the impregnant contains furfural or furfural alcohol or a mixture thereof, para toluene sulfonic acid, and octylphenoxy(polyoxyethylene) ethanol having about 40 moles of ethylene oxide.

Still other specific objects of the present invention reside in the provision of impregnants of the composition identified in the two preceding objects; in the provision of fine grained, isotropic structures impregnated with such compositions and their polymerization products; and in the provision of components and artifacts obtained by pyrolyzing the organic constituents of the impregnant.

Other important objects, features and advantages of this invention will become apparent to the reader from the foregoing, from the appended claims, and from the following examples which are intended only to illustrate, and not restrict, the scope of the invention as defined in the appended claims.

EXAMPLES

In the Examples below a polyethylene oxide adduct of octyl phenol (i.e. an octylphenoxy(polyethyleneoxy)ethanol) having 40 moles of ethylene oxide is compared to various glycols as a pore-forming agent for carbon-producing liquid impregnants and to a liquid impregnant not including a pore-forming agent. The porosity of the resulting graphite composition is measured by determining its permeability to helium at various pressures. The polyethyleneoxide adduct is TRITON X-100 from Rohm & Haas Co.

Regardless of the impregnant formulation used, all impregnations are carried out under the same process steps. The evacuation, pressurization, curing and baking cycle are all held constant. All helium flow rates are given in cc/minute and are obtained from quarter inch thick samples. All weight pickups are calculated after the final bake.

EXAMPLE I—Polyethylene oxide Adduct as the Pore Forming Agent

| Components | A (%) | B (%) |
|---|---|---|
| Furfural | 73.8 | 52.9 |
| Furfural Alcohol | — | 9.5 |
| Polyethylene oxide Adduct | 17.2 | 31.4 |
| p-Toluenesulfonic Acid (pTSA) | 9.0 | 6.2 |
| Percent Weight Pickup | 3.21 | 3.03 |

| | cc He/Minute at the given p.s.i.g. | | | | | |
|---|---|---|---|---|---|---|
| Impregnant | 40 | 60 | 80 | 100 | 120 | 140 | 160 |
| A | 0.0 | 0.3 | 1.0 | 1.5 | 2.2 | 2.9 | 3.9 |
| B | 0.0 | 0.0 | 0.3 | 0.5 | 0.9 | 1.4 | 2.1 |

EXAMPLE II—No Pore Forming Agent

Composition: 91.7% Furfural and 8.3% pTSA
Percent Weight Pickup = 3.02%
No helium flow detected up to 160 p.s.i.g.

EXAMPLE III—Glycols as Pore Forming Agents

| Components | A (%) | B (%) | C (%) | D (%) |
|---|---|---|---|---|
| Furfural | 54.8 | 64.6 | 74.6 | 54.6 |
| Monoethylene Glycol | 36.8 | 0.0 | 0.0 | 0.0 |
| Triethylene Glycol | 0.0 | 27.0 | 17.0 | 0.0 |
| Tetraethylene Glycol | 0.0 | 0.0 | 0.0 | 37.1 |
| p-Toluenesulfonic Acid | 8.4 | 8.4 | 8.4 | 8.3 |
| Percent Weight Pickup | 2.28 | 3.39 | 3.71 | 2.43 |

| | cc He/Minute at the given p.s.i.g. | | | | | | |
|---|---|---|---|---|---|---|---|
| Impregnant | 40 | 60 | 80 | 100 | 120 | 140 | 160 |
| A | 0 | 0 | 0 | 0 | 0 | 0 | 0 |
| B | 0 | 0 | 0 | 0 | 0 | 0 | 0 |
| C | 0 | 0 | 0 | 0 | 0 | 0 | 0 |
| D | 0 | 0 | 0.1 | 0.4 | 1.0 | 1.7 | 2.3 |

Example IIIC is similar to Example IA in that both comprise about 75 percent furfural and about 17 percent of the pore-forming agent (by weight). Note however that the pore-forming agent of the present invention is permeable to helium at a pressure of as low as 60 psig while at a pressure of 160 psig Example IIIC is impermeable. This comparison demonstrates that the pore-forming agents of this invention provide interconnected micropores in the carbonized or pyrolyzed composites.

Example IIID shows some permeability to helium at the pressures tested; however, the impregnant comprises 37 percent, by weight, of the glycol. A comparison of Example IA and IIIC demonstrates that a porous composite may be obtained, with the liquid impregnants of this invention, at a much lower concentration of pore-forming agent than with liquid impregnants comprising glycols.

The porosity characteristics and surface areas of certain of the graphite compositions are tested by means of mercury porosimetry and the results summarized below:

| | Example | | | |
|---|---|---|---|---|
| | IA | IB | II | IIID |
| Average Pore Size, Microns | 0.13 | 0.04 | 0.08 | 0.15 |
| Percent Closed Porosity | 41 | 34 | 50 | 27 |
| Surface Area, m²/gm | 2.3 | 6.3 | 2.3 | 2.3 |

A comparison of EXAMPLES IA and IB shows that a higher concentration of the surfactant decreases the average pore size. Moreover, a comparison of EXAMPLES IB and IIID, demonstrates that, at substantially equivalent concentrations of a glycol and a surfactant, the surfactant provides a decreased pore size.

Note also that, when a pore-forming agent is omitted, the resulting graphite composition has 50 percent closed pores, while less than 50 percent of the pores are closed when a pore-forming agent is used. Moreover, when the pore-forming agent of this invention is compared to the glycol pore-forming agent, a smaller average pore size is obtained with approximately equivalent open porosity. (Compare, e.g. EXAMPLES IB and IIID.)

Representative forms of the present invention have been described above, but the invention may be embodied in other specific forms without departing from the spirit or essential characteristics thereof. The disclosed embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent of the United States is:

1. A structure which is capable of being converted into a densified carbonaceous artifact, said structure being composed of a body which is essentially a fine grained, isotropic carbon with the pores thereof filled with a liquid impregnant containing furfural and/or furfural alcohol, an acid polymerization catalyst, and one or more pore-forming agents comprising a polyalkylene oxide adduct or the polymerization products of an impregnant as aforesaid.

2. A structure as defined in claim 1 and capable of being converted into a densified carbonaceous body wherein the constituents of the impregnant are present in the following properties:

| Furfural, furfural alcohol or mixture thereof | 40–85 Volume %, and |
|---|---|
| Acid catalyst | 2–20 Weight % based on furfural, furfural alcohol or mixture thereof. |

3. A structure as defined in either of the preceding claims 1 or 2 and capable of being converted into a densified carbonaceous body wherein the acid catalyst constituent of the impregnant is para toluene sulfonic, phosphoric, or hydrocholoric acid.

4. A structure as defined in either of the preceding claims 1 or 2 and capable of being converted into a densified carbonaceous body wherein the pore-forming agent constituent of the impregnant comprises a polyethylene oxide adduct.

5. A structure as defined in claim 4 and capable of being converted into a densified carbonaceous body wherein the pore-forming agent constituent of the liquid impregnant comprises a polyethylene oxide adduct of an alkylphenol.

6. A structure which is capable of being converted into a densified carbonaceous artifact, said structure being composed of a body which is essentially a fine grained, isotropic carbon with the pores thereof filled with a liquid impregnant containing furfural and/or furfural alcohol, an acid polymerization catalyst, and one or more pore-forming agents comprising a surfactant selected from the group consisting of anionic, cationic, nonionic and amphoteric surfactants or the polymerization products of an impregnant as aforesaid.

* * * * *